Figure 1:
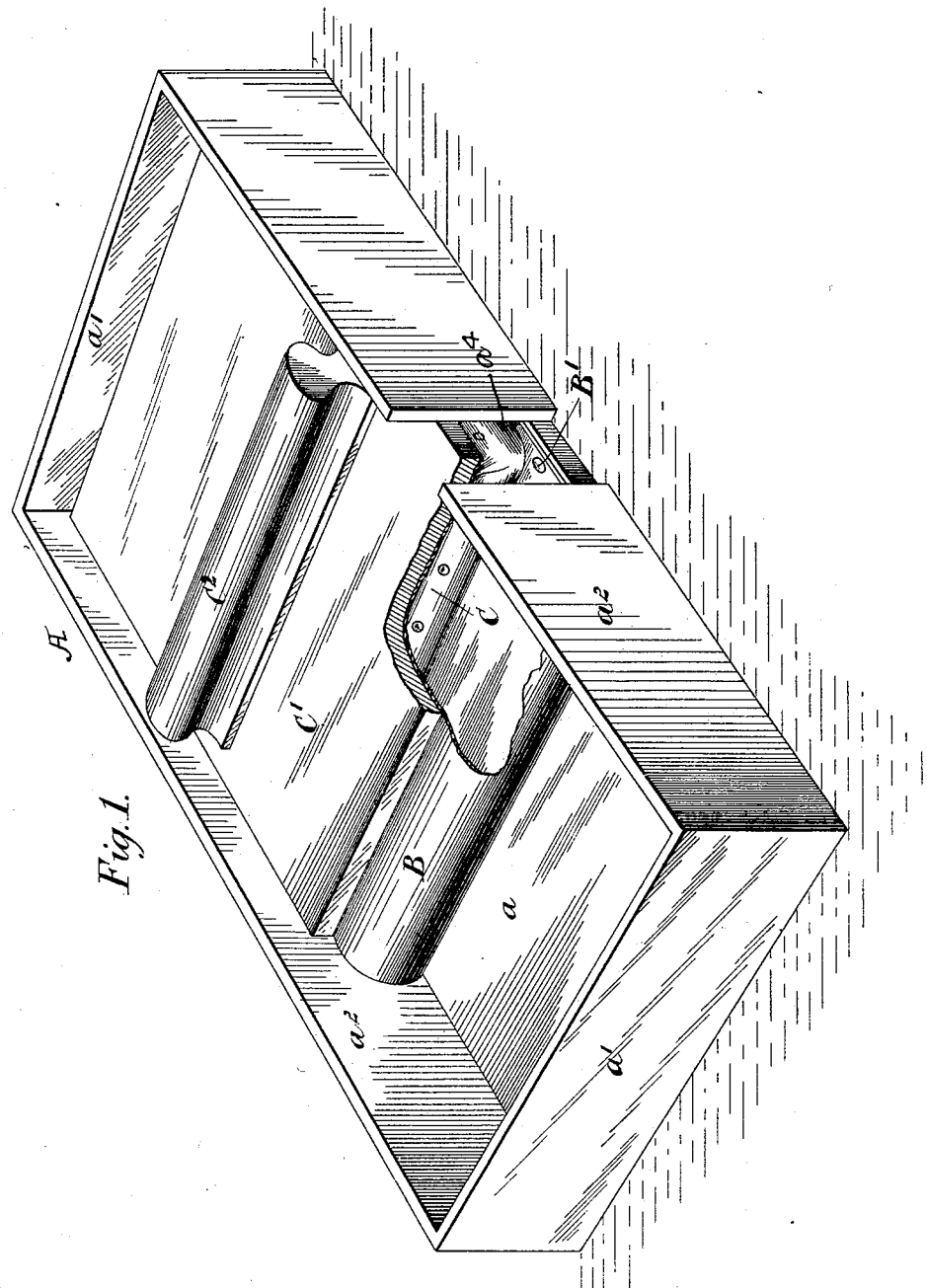

(No Model.) 2 Sheets—Sheet 1.

J. F. C. FARQUHAR.
KNIFE CLEANER AND POLISHER.

No. 487,728. Patented Dec. 13, 1892.

Witnesses
Alle N Dobson
Charles E Graves.

Inventor
John Frederick Cooke Farquhar
By Foster Freeman
Attorneys (No Model.) 2 Sheets—Sheet 2.
J. F. C. FARQUHAR.
KNIFE CLEANER AND POLISHER.
No. 487,728. Patented Dec. 13, 1892.
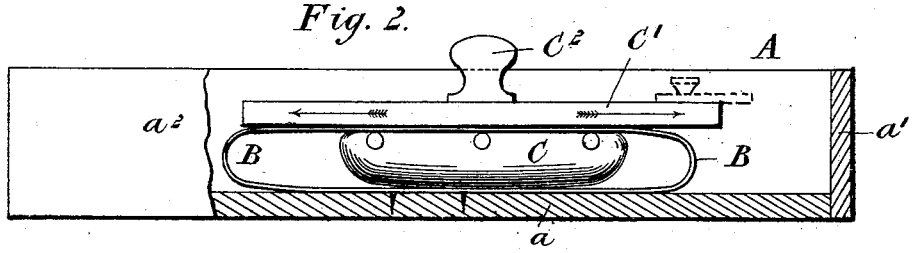
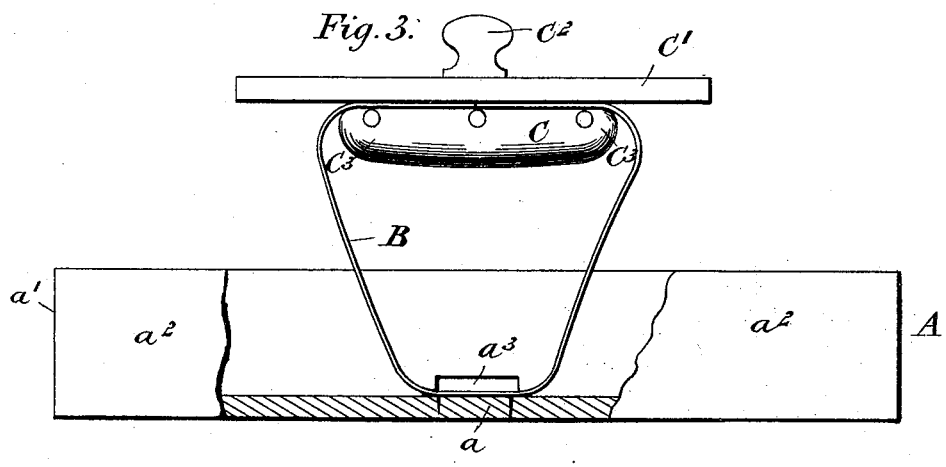
Witnesses
Alle N. Dobson
Charles E. Graves
Inventor
John Frederick Cooke Farquhar
By Foster Freeman
Attorneys

UNITED STATES PATENT OFFICE.

JOHN FREDERICK COOKE FARQUHAR, OF SYDNEY, NEW SOUTH WALES, ASSIGNOR TO PERCY ROBERT CRAFT, OF LONDON, ENGLAND.

KNIFE CLEANER AND POLISHER.

SPECIFICATION forming part of Letters Patent No. 487,728, dated December 13, 1892.

Application filed May 19, 1892. Serial No. 433,574. (No model.)

*To all whom it may concern:*

Be it known that I, JOHN FREDERICK COOKE FARQUHAR, a subject of the Queen of England, residing at Ashfield, Sydney, New South Wales, have invented certain new and useful Improvements in Knife Cleaners and Polishers, of which the following is a specification.

The object of this invention is to provide a means whereby the polishing-powder or polishing material used may be thrown onto the surface of the object being polished at each motion of the rubber or brush. To effect this I lay the article to be polished horizontally across the center of a band of leather or other suitable material, which is laid flat onto a suitable base-plate, this band being attached at or near its center to the base-plate and its two extremities brought upward and over toward the center and attached to the rubber or brush above, in effect making an endless band having the rubber fixed centrally above and the object to be polished centrally below. The polishing material is spread on the lower half of the band and onto the object to be polished, the band being of such length as to allow the rubber sufficient movement horizontally over the face of the object to be polished. By moving the rubber horizontally across the face of the object being polished one half of the band will travel forward in front of the rubber and the other half will follow behind the rubber, curling over and lifting with it the polishing-powder which was on the lower surface, and will thus distribute the powder onto the object being polished. When the rubber has been moved forward in one direction as far as it can go—that is, until that portion of the band which follows is drawn taut by means of its fixture at or near the center of the base-plate—the rubber is then moved backward, carrying with it the polishing-powder which has been carried across the center, and thereby carrying it again over the object being polished. By this means every movement of the rubber brings the polishing-powder into direct contact with the object being polished. By slightly lifting the pad off the object the band may be made to throw the powder beyond as well as onto the object, so as to distribute the powder where required.

The whole apparatus can be inclosed in a suitable box or covering, thereby preventing the loss of the polishing-powder and preventing dust from escaping.

In the accompanying drawings I have, as an example, represented an apparatus for polishing knives, but which, with slight modification, as hereinafter explained, may be adapted for polishing other articles of metal, glass, or other material.

In the drawings, Figure 1 is a perspective view partly broken away. Fig. 2 is a side elevation with part of the box or container in section and with the pad or rubber in its lowered or working position, and Fig. 3 is a side elevation with the box or container partly in section and with the pad or rubber in a raised position.

Like letters indicate like parts throughout the drawings.

A is the box or container, constructed of a bottom or base plate $a$, two end walls $a'$, and two side walls $a^2$, one or each of which latter, when the apparatus is constructed for polishing knives, is provided with an opening $a^3$, such as is shown in Fig. 3, or a gap $a^4$, such as is shown in Fig. 1, or, as represented, one wall $a^2$ may have an opening $a^3$ and the other wall $a^2$ a gap $a^4$. Both of these openings or gaps are not generally necessary for polishing ordinary knives, but are provided for the accommodation of long-bladed knives, such as carvers.

B is the leather or equivalent band attached at or near its center by any suitable means, as by nails or tacks B', Fig. 1, to the base-plate $a$. The two extremities of this band are brought upward and over toward the center and preferably secured between the pad or rubber C and its board or back C', which is provided with a suitable handle $C^2$. The width of the back C' is approximately equal to the distance between the two walls $a^2$, and its length is such as to suitably restrict the horizontal movement of the pad (in the directions of the arrows in Fig. 2) within the box A. A convenient length of travel is one which will allow the pad C to just clear the object to be cleaned, its rounded edges $C^3$ enabling it to readily again mount above the object to be cleaned. Adjustable slides or other suitable means may be provided upon the back C' to enable its stroke to be altered when required, as indicated in dotted lines in Fig. 2.

When the before-described apparatus is to be used for polishing knives, a knife is passed through the gap $a^4$ or opening $a^3$ and is inserted between the band B and the rubber C, which may, if desired, be raised for this purpose. The rubber C may then be raised, as shown in Fig. 3, so that the polishing powder or material may be distributed over the blade of the knife. The rubber C is then lowered, and, while being slightly pressed down onto the knife, is moved from end to end of the box, the result being that the polishing material is repeatedly thrown onto and across the knife. When polishing a carving-knife or other such long-bladed knife, the blade is passed through both the opening $a^3$ and gap $a^4$, and is moved backward and forward in the direction of its length, while the rubber C is operated in the direction transverse to such motion.

The before-described apparatus is capable of being modified without departing from the spirit of the invention by those skilled in the art by the substitution of equivalent devices arranged and operating in substantially the manner set forth in regard to those shown in the drawings as illustrating my invention.

I claim—

1. In polishing apparatus such as described, the combination, with a box or container, of a band and rubber, substantially as described.

2. A polishing apparatus comprising a pad and a band connected to the pad and arranged to receive the article to be polished between the pad and band and to distribute the polishing material, substantially as described.

In testimony whereof I have hereto set my hand in the presence of the two subscribing witnesses.

JOHN FREDERICK COOKE FARQUHAR.

Witnesses:
H. D. FARQUHAR.
S. P. HEFFECK.